United States Patent [19]

Mellors

[11] 4,352,869
[45] Oct. 5, 1982

[54] SOLID STATE ELECTROLYTES

[75] Inventor: Geoffrey W. Mellors, North Royalton, Ohio

[73] Assignee: Union Carbide Corporation, Danbury, Conn.

[21] Appl. No.: 280,486

[22] Filed: Jul. 6, 1981

Related U.S. Application Data

[63] Continuation of Ser. No. 219,875, Dec. 24, 1980, abandoned.

[51] Int. Cl.$^3$ .............................................. H01M 6/18
[52] U.S. Cl. .................................... 429/191; 429/199; 252/62.2; 423/462
[58] Field of Search ................... 429/191, 199, 30, 33, 429/46, 193; 204/195 S; 252/62.2; 423/462, 464, 463

[56] References Cited

PUBLICATIONS

L. E. Nagel and M. O'Keefee, "Fast Ion Transport in Solids", p. 165, Ed., W. Van Gool, North Holland Publishing Co., Amsterdam & London, (1973).
T. Takahashi, H. Iwahara and T. Ishikawa, J. Electrochem. Soc., 124, 280 (1977).
J. M. Reau and J. Poitier, Ch. 19, p. 320, "Solid Electrolytes", Ed., P. Hagenmuller, Academic Press, (1978).
A. Sher, R. Solomon, K. Lee and M. W. Muller, Phys. Rev., 144, 593, (1966).
R. Solomon, A. Sher and M. W. Muller, J. Appl. Phys., 37, 3427, (1966).
W. L. Fiedler, NASA Tech. Notes D-5505, (1969).
C. O. Tiller, A. C. Lilly and B. C. LaRoy, Phys. Rev. B, 8, 4787, (1973).
A. C. Lilly, B. C. LaRoy, C. O. Tiller and B. W. Whiting, J. Electrochem. Soc., 120, 1673, (1973).
M. O'Keefee, Science, 180, 1276, (1973).

*Primary Examiner*—Anthony Skapars
*Attorney, Agent, or Firm*—Cornelius F. O'Brien

[57] ABSTRACT

A composition which can be used as a solid state electrolyte comprising at least 70 mole percent of cerium trifluoride and/or lanthanum trifluoride, an alkaline earth metal compound such as a fluoride, and an alkali metal compound such as lithium fluoride.

11 Claims, No Drawings

SOLID STATE ELECTROLYTES

This application is a continuation of our prior U.S. application Ser. No. 219,875, filed Dec. 24, 1980, now abandoned.

FIELD OF THE INVENTION

The invention relates to a composition which can be used as a solid state electrolyte composition comprising cerium trifluoride and/or lanthanum trifluoride, an alkaline earth metal fluoride, chloride and/or carbonate, and an alkali metal fluoride, sulfate, chloride and/or carbonate.

BACKGROUND OF THE INVENTION

Ionic conductivity is usually associated with a flow of ions through an aqueous solution of metallic salts. In the vast majority of practical uses of ionic conductors, i.e., as electrolytes for dry cell batteries, the aqueous solution is immobilized in a paste or gelled matrix to overcome the difficulties associated with handling and packaging a liquid. However, even after immobilization, the system is still subject to possible leakage, has a limited shelf life due to drying out or crystallization of the salts and is suitable for use only within a limited temperature range corresponding to the liquid range of the electrolyte. In addition, the necessity of including a large volume of immobilizing material has hindered the aims of miniaturization.

In attempting to overcome the shortcomings of liquid systems, investigators have surveyed a large number of solid compounds hoping to find compounds which are solid at room temperature and have specific conductances approaching those exhibited by the commonly used liquid systems. Most solid compounds that might be considered as solid electrolytes have specific conductances at room temperature (20° C.) in the range of $10^{-6}$ to $10^{-15} \text{ohm}^{-1}\text{cm}^{-1}$ as compared to aqueous solutions of salts which nominally have a specific conductance of 0.5 to $0.8 \text{ohm}^{-1}\text{cm}^{-1}$.

In addition to the above shortcomings of liquid systems, improved microelectronic circuit designs have generally decreased the current requirements for electronic devices which in turn have enhanced the applicability of solid electrolyte power sources which usually can only deliver currents in the microampere range. These solid electrolyte systems have the inherent advantage of being free of electrolyte leakage and internal gassing problems due to the absence of a liquid phase and consequent corrosion phenomena. In addition, they also have a much longer shelf life than the conventional liquid power sources.

Solid electrolytes must allow ionic transport in the crystal lattice for the cell to operate, while at the same time they must be essentially electronic insulators so as not to internally short the cell. It has been discovered that certain metallic salts which are solids at room temperatures have specific conductances sufficiently high to permit their use in practical battery applications. For example, U.S. Pat. No. 3,723,185 discloses solid state electrolytes of compounds conforming to the general formula AgI-MCN-AgCN or modifications thereof wherein M is potassium, rubidium, cesium or mixtures thereof.

U.S. Pat. No. 4,186,248 discloses a solid state electrolyte comprising an ionically conductive product of a fused ternary mixture of lead fluoride ($PbF_2$), an alkali salt selected from the group of sodium (Na), potassium (K), rubidium (Rb) and cesium (Cs) in a range of between about 1.0 and about 15.0 mole percent and a fluoride, nitrate or sulfate of magnesium, calcium, strontium or barium in a range between about 1 and about 40 mole percent.

It is an object of the present invention to provide a novel ionically conductive product that is solid at room temperature and has a high ionic conductance to permit its use as a solid state electrolyte for battery applications.

Another object of the present invention is to provide a novel solid state electrolyte for battery applications that is essentially an electronic insulator so as not to internally short the cell in which it is used, while at the same time it allows ionic transport in the crystal lattice.

Another object of the present invention is to provide a novel solid state electrolyte composition comprising cerium trifluoride or lanthanum trifluoride, an alkaline earth metal fluoride, chloride or carbonate, and an alkali metal fluoride, sulfate, chloride or carbonate.

The foregoing and additional objects will become more fully apparent from the following description.

SUMMARY OF THE INVENTION

The invention relates to a composition which can be used as a solid state electrolyte composition comprising at least 70 mole percent of at least one trifluoride selected from the group consisting of cerium trifluoride and lanthanum trifluoride, at least one alkaline earth metal compound selected from the group consisting of fluoride, chloride and carbonate, and at least one alkali metal compound selected from the group consisting of fluoride, sulfate, chloride and carbonate.

Although cerium and lanthanum trifluoride are known to be fluoride ion conductors, the magnitude of their conductance, which is about $10^{-6}\text{ohm}^{-1}\text{cm}^{-1}$, is not sufficient for their efficient utilization as an electrolyte component of a solid state cell. To render these materials suitable for use as solid state electrolytes, it has been found that a second component of a specific alkaline earth metal compound has to be added to improve their conductance and a third component of a specific alkali metal compound has to be added to facilitate the formation of the material into solid pellets for use in solid state cells. It is also believed that this third component somewhat enhances the grain boundary conductivity of the composition and thus further improves its conductance. Preferably, the conductance of these solid state electrolytes should be at least $10^{-5}\text{ohm}^{-1}$ centimeter$^{-1}$ and more preferably above about $10^{-4}\text{ohm}^{-1}$ centimeter.

The cerium trifluoride or lanthanum trifluoride component of the composition should be at least 70 mole percent and preferably 75 mole percent of the ternary composition to insure adequate conductance of the composition for its use in a solid electrolyte cell.

The second component which is at least one alkaline earth metal compound, preferably should be present in the composition in an amount such that the mole ratio of the Ce or La from the trifluoride to the alkaline earth metal is in the range of 7:1 to 99:1. A range below 7:1 may not increase the conductance of the trifluorides to $10^{-5}\text{ohm}^{-1}\text{cm}^{-1}$ or above while a range above 99:1 would be similarly ineffective. A preferable range of the mole ratio of the Ce or La to the alkaline earth metal would be 15:1 to 25:1. The preferable alkaline earth metal compounds can be selected from the group consisting of fluorides, chlorides or carbonates with the fluorides being the most preferable.

The third component which is at least one alkali metal compound, preferably should be present in an amount of between about 1 and 15 mole percent of the composition and more preferably between about 3 and 7 mole percent. The alkali metal compound is primarily added as a sintering or binding aid to enable the composition to be formed into a discrete body while also providing the additional feature of increasing the conductance of the composition. Although not wanting to be bound by theory, it is believed that the alkali metal compounds beneficially increase the grain boundary conductance of the composition. The preferable alkali metal compounds can be selected from the group consisting of fluorides, chlorides, sulfates or carbonates with the most preferable alkali metal compounds being fluorides. Examples of suitable alkali metal compounds are LiF, $Li_2SO_4$, RbCl, KF and RbF with LiF being the preferred. The alkali metal compound can be blended with the composition of cerium or lanthanum trifluoride and at least one alkaline earth metal compound, e.g. by adding it to a fused mixture of the trifluoride component and the alkaline earth metal compound component, or all three components of the composition can be fused together.

Preferable solid state cell electrolytes of this invention are $CeF_3$ (90.25 mole %)-$SrF_2$ (4.75 mole %)-LiF (5.00 mole %) and $LaF_3$ (90.25 mole %)-$SrF_2$ (4.75 mole %)-LiF (5.00 mole %), with the latter being preferable for use as a solid state cell electrolyte. The composition of this invention could also be used as a capacitor dielectric, a fluoride specific ion electrode or as a high temperature sensor.

EXAMPLE I 4.681 g (99.9% pure) cerium trifluoride ($CeF_3$) and 0.157 g ultra-pure strontium fluoride ($SrF_2$) were melted together in a graphite crucible in an argon environment with the Ce:Sr mole ratio being 19:1. The mixture was heated in a high-frequency induction furnace in which the temperature was held at 1550°–1600° C. for about five minutes, a period experimentally found to result in a substantially homogeneous melt. After the material was cool under argon, it was transferred to an argon-filled dry box and ground to a fine powder.

The powdered mixture of $CeF_3$ and $SrF_2$ (4.837 g) was ground under acetone with 0.034 g lithium fluoride until good mixing had been obtained. The acetone was then initially removed in a vacuum at room temperature and finally at 120° C. for ½ hour. The powder was then heated in a vacuum at 750° C. for four hours, pelletized at about 100,000 psi, and sintered for four hours at 950° C. in a vacuum. Four sample pellets were made as described above having the composition as shown in Table 1, and the properties observed and measured are shown in Table 2.

TABLE I

|  | Mole Percent | Weight Percent |
| --- | --- | --- |
| $CeF_3$ | 90.25 | 96.08 |
| $SrF_2$ | 4.75 | 3.22 |
| LiF | 5.00 | 0.70 |

TABLE II

| Sample | 1 | 2 | 3 | 4 |
| --- | --- | --- | --- | --- |
| Thickness (cm) | 0.127 | 0.116 | 0.137 | 0.112 |
| Diameter (cm) | 0.993 | 0.993 | 0.991 | 0.993 |
| Area ($cm^2$) | 0.775 | 0.775 | 0.770 | 0.775 |
| Volume (cc) | $9.84 \times 10^{-2}$ | $8.9 \times 10^{-2}$ | $10.6 \times 10^{-2}$ | $8.67 \times 10^{-2}$ |
| Weight (g) | 0.552 | 0.468 | 0.553 | 0.464 |
| Density (g/cc) | 5.61 | 5.21 | 5.21 | 5.35 |
| Meas'd. Resistance ($\Omega$)* | 886 | 581 | 599 | 492 |
| Sp. Resistivity ($\Omega$ cm) | 5405 | 3895 | 3366 | 3410 |
| Sp. Cond. ($\Omega^{-1}$ $cm^{-1}$) | $1.85 \times 10^{-4}$ | $2.57 \times^{-4}$ | $2.97 \times 10^{-4}$ | $2.93 \times 10^{-4}$ |

*1 kHz, room temperature

EXAMPLE II

A water slurry of $CeF_3$, $SrF_2$ and LiF in the proportions 90.25$CeF_3$, 4.75$SrF_2$, 5.00LiF was prepared. Mixing was performed using a pestle and mortar, after which the mixture was oven-dried in air at 200° C. A cylinder was formed from the dried powder and prefired at 600° C. for one hour in a hydrogen fluoride atmosphere. The resultant material was ground and formed into pellets at 10,000 psi. The pellet was sintered at 800° C. for 45 minutes. It had a density of 5.52 g/cc and a specific conductance of $4 \times 10^{-4} ohm^{-1} cm^{-1}$.

EXAMPLE III

Lanthanum trifluoride (4.65 g) and strontium fluoride (0.157 g) in the mole ratio 19:1 were melted together in a high-frequency induction furnace. Lithium fluoride (0.034 g) was blended into the $LaF_3$-$SrF_2$ powder via the acetone method as described in Example I. A pellet was formed with a density of 4.89 g/cc and a specific conductance of $3.94 \times 10^{-5} ohm^{-1} cm^{-1}$.

EXAMPLE IV

Using the procedure of Example I, 4.386 g $CeF_3$ and 0.188 g $SrF_2$ in the mole ratio 14.8:1 were melted together. After the sample had been ground to a fine powder, 0.275 g of vacuum dried $Li_2SO_4$ was mixed using acetone as described in Example I. A pellet was then formed having a density of 5.04 g/cc and a specific conductance of $1.59 \times 10^{-4} ohm^{-1} cm^{-1}$.

EXAMPLE V

Using the procedure in Example I, 4.213 g $CeF_3$ and 0.371 g of $CaF_2$ (mole ratio Ce:Ca=9:1) were melted together in a high-frequency induction furnace. Lithium fluoride (0.032 g) was then blended into the powder using acetone, and the acetone was removed as also described in Example I. A pellet was then formed having a specific conductance of $4.74 \times 10^{-5} ohm^{-1} cm^{-1}$ and a density of 4.76 g/cc.

EXAMPLE VI

Five electrolyte compositions were made as described in Example I starting with a Ce:Sr mole ratio of 14.8:1 and the alkaline earth compound and alkali metal compounds shown in Table III. The measured conductivity of each electrolyte composition is shown in Table III.

TABLE III

| Electrolyte Compositions (mole ratio) | Specific Conductance($\Omega^{-1}cm^{-1}$) |
|---|---|
| $89CeF_3$—$6SrF_2$—NaF | $1.06 \times 10^{-4}$ |
| $89CeF_3$—$6SrF_2$—5Kf | $8.62 \times 10^{-5}$ |
| $89CeF_3$—$6SrF_2$—5RbF | $5.45 \times 10^{-4}$ |
| $89CeF_3$—$6SrF_2$—5LiCl | $1.72 \times 10^{-4}$ |
| $89CeF_3$—$SrF_2$—rRbCl | $1.01 \times 10^{-4}$ |

EXAMPLE VII

A number of $CeF_3$-and/or $LaF_3$-containing pellets were prepared in the same manner as in Example I, and the results are shown in Table IV.

TABLE IV

| Composition (Molar) | Sp. Conductance, 1 kHz (ohm$^{-1}$cm$^{-1}$) | Density,g/cc |
|---|---|---|
| $90.25CeF_3$—$4.75CaF_2$—$5.00LiF$ | $4.67 \times 10^{-5}$ | 5.10 |
| $90.25CeF_3$—$4.75BaF_2$—$5.00LiF$ | $4.32 \times 10^{-5}$ | 4.79 |
| $94.05CeF_3$—$4.95CaF_2$—$1.00LiF$ | $4.23 \times 10^{-5}$ | 4.83 |
| $94.05CeF_3$—$4.95BaF_2$—$1.00LiF$ | $3.88 \times 10^{-5}$ | 4.98 |
| $89.10CeF_3$—$9.90CaF_2$—$1.00LiF$ | $3.92 \times 10^{-5}$ | 4.78 |
| $85.5CeF_3$—$9.50BaF_2$—$5.00LiF$ | $4.98 \times 10^{-5}$ | 4.60 |
| $85.50CeF_3$—$9.50BaF_2$—$5.00RbCl$ | $3.47 \times 10^{-5}$ | 5.02 |
| $85.50CeF_3$—$9.50CaF_2$—$5.00LiF$ | $4.74 \times 10^{-5}$ | 5.14 |
| $94.05CeF_3$—$0.95CaF_2$—$5.00LiF$ | $1.28 \times 10^{-5}$ | 5.18 |
| $98.01CeF_3$—$0.99CaF_2$—$1.00LiF$ | $1.32 \times 10^{-5}$ | 5.20 |
| $81.00CeF_3$—$9.00SrF_2$—$10.00LiF$ | $4.13 \times 10^{-5}$ | 4.77 |
| $85.50CeF_3$—$9.50SrF_2$—$5.00LiF$ | $4.05 \times 10^{-5}$ | 5.04 |
| $85.50CeF_3$—$4.50SrF_2$—$10.00LiF$ | $2.08 \times 10^{-4}$ | 5.32 |
| $72.20CeF_3$—$3.80SrF_2$—$19.00MgF_2$—$5.00LiF$ | $1.35 \times 10^{-4}$ | 5.16 |
| $85.50CeF_3$—$9.50SrF_2$—$5.00Li_2SO_4$ | $5.26 \times 10^{-5}$ | 5.22 |
| $94.05CeF_3$—$0.95SrF_2$—$5.00RbF$ | $4.18 \times 10^{-5}$ | 4.98 |
| $94.05CeF_3$—$0.95SrF_2$—$5.00RbCl$ | $5.41 \times 10^{-5}$ | 5.06 |
| $94.05CeF_3$—$0.95SrF_2$—$5.00Li_2SO_4$ | $9.52 \times 10^{-5}$ | 5.33 |
| $94.05CeF_3$—$0.95SrF_2$—$5.00LiF$ | $1.92 \times 10^{-5}$ | 5.26 |
| $85.50CeF_3$—$9.50CaF_2$—$5.00KF$ | $2.50 \times 10^{-5}$ | 5.79 |
| $85.50CeF_3$—$9.50CaF_2$—$5.00RbCl$ | $1.26 \times 10^{-5}$ | 4.76 |
| $85.50CeF_3$—$9.50CaF_2$—$5.00Li_2SO_4$ | $2.37 \times 10^{-5}$ | 5.23 |
| $85.50CeF_3$—$9.50CaF_2$—$5.00Li_2CO_3$ | $2.56 \times 10^{-5}$ | 5.07 |
| $81.00CeF_3$—$9.00CaF_2$—$10.00LiF$ | $2.76 \times 10^{-5}$ | 4.81 |
| $90.00CeF_3$—$5.00SrCl_2$—$5.00LiF$ | $1.36 \times 10^{-4}$ | 5.14 |
| $90.00CeF_3$—$5.00SrCO_3$—$5.00LiF$ | $2.10 \times 10^{-4}$ | 5.07 |
| $89.00CeF_3$—$6.00SrF_2$—$5.00Li_2SO_4$ | $1.59 \times 10^{-4}$ | 5.06 |
| $90.25LaF_3$—$4.75SrF_2$—$5.00LiF$ | $6.25 \times 10^{-5}$ | 4.89 |
| $94.05LaF_3$—$4.95SrF_2$—$1.00LiF$ | $1.31 \times 10^{-5}$ | 5.03 |
| $85.71LaF_3$—$9.52SrF_2$—$4.77LiF$ | $1.72 \times 10^{-5}$ | 5.89 |
| $85.71LaF_3$—$9.52CaF_2$—$4.77LiF$ | $1.05 \times 10^{-5}$ | 5.80 |
| $85.71LaF_3$—$9.52BaF_2$—$4.77LiF$ | $2.17 \times 10^{-5}$ | 5.70 |
| $85.71LaF_3$—$9.52MgF_2$—$4.77LiF$ | $1.01 \times 10^{-5}$ | 5.86 |
| $45.125CeF_3$—$45.125LaF_3$—$4.75SrF_2$—$5.00LiF$ | $1.78 \times 10^{-4}$ | 5.68 |

EXAMPLE VIII

A cerium foil anode, a solid electrolyte layer made from the molar mixture $90.25CeF_3$-$4.75SrF_2$-$5.00LiF$ and a cathode consisting of a mixture of mercuric fluoride ($HgF_2$), graphite and the same powdered solid electrolyte composition (50-25-25% by weight) was pressed together in the argon-filled dry box. An open circuit voltage of 3.70 volts was obtained. When the cell was discharged across a 1-megohm resistor, an initial voltage of 2.60 volts was observed.

EXAMPLE IX

An anode consisting of magnesium powder and a powdered solid electrolyte ($90.25CeF_3$-$4.75SrF_2$-$5.00LiF$) in a 50-50 weight % ratio was compacted onto a pressed powder pellet of the same electrolyte material and in turn to a cathode consisting of ($MnF_3$-$PbO_2$), the same cerium fluoride electrolyte composition and graphite in a 50-25-25 weight % ratio. An open circuit voltage of 2.35 volts was obtained from this cell.

EXAMPLE X

A magnesium-aluminum alloy anode (50/50 weight percent) was prepared by melting the pure constituents under an atmosphere of 90/10 volume % argon/hydrogen. The alloy was ground to a fine powder and assembled into a cell having the following components:

| Anode | Electrolyte | Cathode |
|---|---|---|
| Mg/Al + ($CeF_3$—$SrF_2$—LIF) 50%–50% by wt.) | $90.25CeF_3$—$4.75SrF_2$—$5.00LiF$ | $MnF_3$ + ($CeF_3$ $SrF_2$—LiF + graphite 50-25-25% by wt |

An open circuit voltage of 2.12 volts was obtained, and 1.90 volts was observed initially after a load resistor of 1 megohm was connected across the cell terminals.

EXAMPLE XI

An anode of powdered misch metal [cerium 50~55 wt. %, lanthanum (18–27%), neodymium (12–18%), praseodymium (4–6%), and other rare earths (1–3%)] and an electrolyte of $90.25CeF_3$-$4.75SrF_2$-$5.00LiF$ (53% misch metal-47% electrolyte by weight) an electrolyte layer of the same composition and a cathode of $PbSnF_4$+Pb+some of the electrolyte, were pressed together to form a solid state cell. At 125° C., the open circuit voltage was 2.28 volts. The discharge efficiency, based on cathode capacity, was 43% on a 100-K ohm load to a 1.3 volt cutoff.

EXAMPLE XII

Three cells were constructed as in Example XI except that the cathodes used were $KBiF_4$, $PbF_2$ and $CdF_2$. The cells were discharged as in Example XI and efficiencies of 30% ($KBiF_4$ cell), 35% ($PbF_2$ cell) and 13% ($CdF_2$ cell) respectively, were obtained to a 0.8 volt cutoff on a 100 K-ohm load at 125° C.

EXAMPLE XIII

A cell was constructed using an anode of a vapor deposited lanthanum, a solid electrolyte of $90.25LaF_3$-$4.75SrF_2$-$5.00LIF$, and a vapor deposited cathode of $PbF_2$. The outer layer of lanthanum and $PbF_2$ were coated with a vapor deposit of copper. The cell exhibited an open circuit voltage of 2.28 volts and when discharged across a 400 K-ohm load at room temperature to a 1.73 volt cutoff it delivered a discharge efficiency based on cathode capacity of 84%.

From the examples above it is evident that the electrolytes of the present invention may be employed with a number of different pure metal anodes (e.g. Li, Sr, Ba, Ca, Mg, Ce, La) or alloy anodes such as alloys of cerium (e.g. Ce-Sn, Ce-Fe, Ce-Pb or misch metal), lanthanum (e.g. La-misch metal), magnesium (Mg-Al, Mg-Pb, etc.) and other alloys; and fluorine-containing cathodes e.g. simple fluorides such as $AgF$, $AgF_2$, $PbF_2$, $PbF_3$, $BiF_3$, $HgF_2$, $CuF_2$, $CdF_2$, $ZnF_2$, $MnF_3$, $CoF_3$; cathodes as disclosed in U.S. Pat. No. 4,216,279, i.e. $MnO_2$-fluoride mixtures; cathodes as disclosed in U.S. Pat. No. 4,218,527, i.e. $PbO_2$-fluoride mixtures; and ionically conducting complex salts such as $KBiF_4$, $TlBiF_4$ and $RbBiF_4$ and complex compounds such as $KBrF_4$, $RbBrF_4$, $NOBrF_4$, $AgBrF_4$, $Ba(BrF_4)_2$ and $KIF_6$.

What is claimed:

1. A composition which can be used as a solid state electrolyte comprising at least 70 mole percent of at least one trifluoride selected from the group consisting of cerium trifluoride and lanthanum trifluoride, at least one alkaline earth metal compound selected from the group consisting of fluorides, chlorides and carbonates; and at least one alkali metal compound selected from the group consisting of fluorides, sulfates, chlorides and carbonates.

2. The composition of claim 1 wherein the range of the mole ratio of cerium or lanthanum from the trifluoride to the alkaline earth metal is in the range of 7:1 to 99:1.

3. The composition of claim 1 wherein the range of the mole ratio of cerium or lanthanum from the trifluoride to the alkaline earth metal is in the range of 15:1 to 25:1.

4. The composition of claim 1 wherein the alkali metal compound is present in an amount between about 1 and about 15 mole percent based on the electrolyte composition.

5. The composition of claim 2 wherein the alkali metal compound is present in an amount between about 1 and about 15 mole percent based on the electrolyte composition.

6. The composition of claim 1, 2, 3, 4 or 5 wherein the alkali metal compound is selected from the group consisting of LiF, $Li_2SO_4$, KF, RbCl and RbF.

7. The composition of claim 1 wherein the composition is selected from the group consisting of $CeF_3$-$SrF_2$-LiF; $LaF_3$-$SrF_2$-Lif; $CeF_3$-$SrCl_2$-LiF; and $LaF_3$-$SrF_2$-RbCl.

8. A solid state cell employing as the solid state electrolyte the composition of claim 1, 2, 3, 4 or 5, an anode and a solid cathode.

9. The solid state cell of claim 8 wherein the anode is selected from the group consisting of Li, Sr, Ba, Ca, Mg, Ce, La, alloys of cerium, alloys of lanthanum and alloys of magnesium; and the cathode is selected from the group consisting of $AgF$, $Ag_2F$, $PbF_2$, $PbF_3$, $BiF_3$, $HgF_2$, $CuF_2$, $CdF_2$, $ZnF_2$, $MnF_3$, $CoF_3$; $MnO_2$-fluoride mixtures, $PbO_2$-fluoride mixtures, KBiF, $TlBiF_4$, $RbBiF_4$, $KBrF_4$, $RbBrF_4$, $NOBrF_4$, $AgBrF_4$, $Ba(BrF_4)_2$ and $KIF_6$.

10. The solid state cell of claim 8 wherein the solid state electrolyte is $CeF_3$-$SrF_2$-LiF, the anode is cerium and the cathode is $PbF_2$.

11. The solid state cell of claim 8 wherein the solid state electrolyte is $LaF_3$-$SrF_2$-LiF, the anode is lanthanum and the cathode is $PbF_2$.

* * * * *

UNITED STATES PATENT AND TRADEMARK OFFICE
CERTIFICATE OF CORRECTION

PATENT NO. : 4,352,869
DATED : October 5, 1982
INVENTOR(S) : Geoffrey W. Mellors It is certified that error appears in the above—identified patent and that said Letters Patent is hereby corrected as shown below:

Column 4, under Table II under the first column titled "Sample" delete "Volume 9.84 x $10^{-2}$ (cc)" and substitute therefor --Volume (cc)--.

Column 4, under Table II under the column titled "1" delete "8.9 x $10^{-2}$" and substitute therefor --9.84 x $10^{-2}$--.

Column 4, under Table II under the column titled "2" delete "10.6 x $10^{-2}$" and substitute therefor --8.9 x $10^{-2}$--.

Column 4, under Table II under the column titled "3" delete "8.67 x $10^{-2}$" and substitute therefor --10.61 x $10^{-2}$--.

Column 4, under Table II under the column titled "4" add --8.67 x $10^{-2}$--.

Column 5, under Table III delete "89$CeF_3$_6$SrF_2$_NaF" and substitute therefor --89$CeF_3$_6$SrF_2$_5NaF--.

Column 5, under Table III delete "89$CeF_3$_$SrF_2$_rRbCl" and substitute therefor --89$CeF_3$_6$SrF_2$_5RbCl--.

Signed and Sealed this

Fifth Day of April 1983

[SEAL]

Attest:

GERALD J. MOSSINGHOFF

Attesting Officer   Commissioner of Patents and Trademarks